(12) United States Patent
Modelski et al.

(10) Patent No.: US 6,684,300 B1
(45) Date of Patent: Jan. 27, 2004

(54) EXTENDED DOUBLE WORD ACCESSES

(75) Inventors: Richard P. Modelski, Hollis, NH (US);
John R. Edwards, Chelmsford, MA (US)

(73) Assignee: Nortel Networks Limited (CA)

( * ) Notice: Subject to any disclaimer, the term of this patent is extended or adjusted under 35 U.S.C. 154(b) by 430 days.

(21) Appl. No.: 09/741,855

(22) Filed: Dec. 22, 2000

(51) Int. Cl.$^7$ .............................................. G06F 12/00
(52) U.S. Cl. ...................... 711/149; 711/201; 711/211; 711/217; 710/66; 710/307
(58) Field of Search ................................. 711/149, 201, 711/211, 217; 710/66, 307

(56) References Cited

U.S. PATENT DOCUMENTS

| | | | | |
|---|---|---|---|---|
| 4,633,434 A | * | 12/1986 | Scheuneman | 713/400 |
| 5,083,260 A | * | 1/1992 | Tsuchiya | 710/113 |
| 5,649,125 A | * | 7/1997 | Tietjen et al. | 710/305 |
| 5,689,659 A | * | 11/1997 | Tietjen et al. | 710/307 |
| 5,812,798 A | * | 9/1998 | Moyer et al. | 710/307 |
| 5,867,672 A | * | 2/1999 | Wang et al. | 710/307 |
| 6,047,347 A | * | 4/2000 | Hansen et al. | 710/307 |
| 6,061,510 A | * | 5/2000 | Klein et al. | 703/25 |
| 6,067,604 A | * | 5/2000 | Ramachandran et al. | 711/149 |
| 6,185,629 B1 | * | 2/2001 | Simpson et al. | 710/10 |
| 6,349,364 B1 | * | 2/2002 | Kai et al. | 711/133 |
| 6,425,065 B2 | * | 7/2002 | DiMarco et al. | 711/212 |
| 6,434,674 B1 | * | 8/2002 | DeWilde et al. | 711/149 |

* cited by examiner

*Primary Examiner*—Matthew Kim
*Assistant Examiner*—Brian R. Peugh
(74) *Attorney, Agent, or Firm*—Steubing McGuinness & Manaras LLP

(57) ABSTRACT

A switching router memory map is organized as 64-bit wide double words. The bi-directional data bus is only 32-bits wide, so the Least Significant Words (LSW) are mapped to the even addresses and the Most Significant Words (MSW) are mapped to the odd address. When the host writes to the even address the 32-bit data is stored in the bidirectional data bus buffer. When the host writes to the odd address the entire 64-bit double word access is posted to the appropriate global access bus. When a read operation is performed from an even address the entire 64-bit double word access is performed by the appropriate global access bus. The LSW is available on the bi-directional data bus address data pins and the 32-bit MSW is buffered within the bi-directional data bus. The host can access the MSW by performing a read from the odd address.

5 Claims, 2 Drawing Sheets

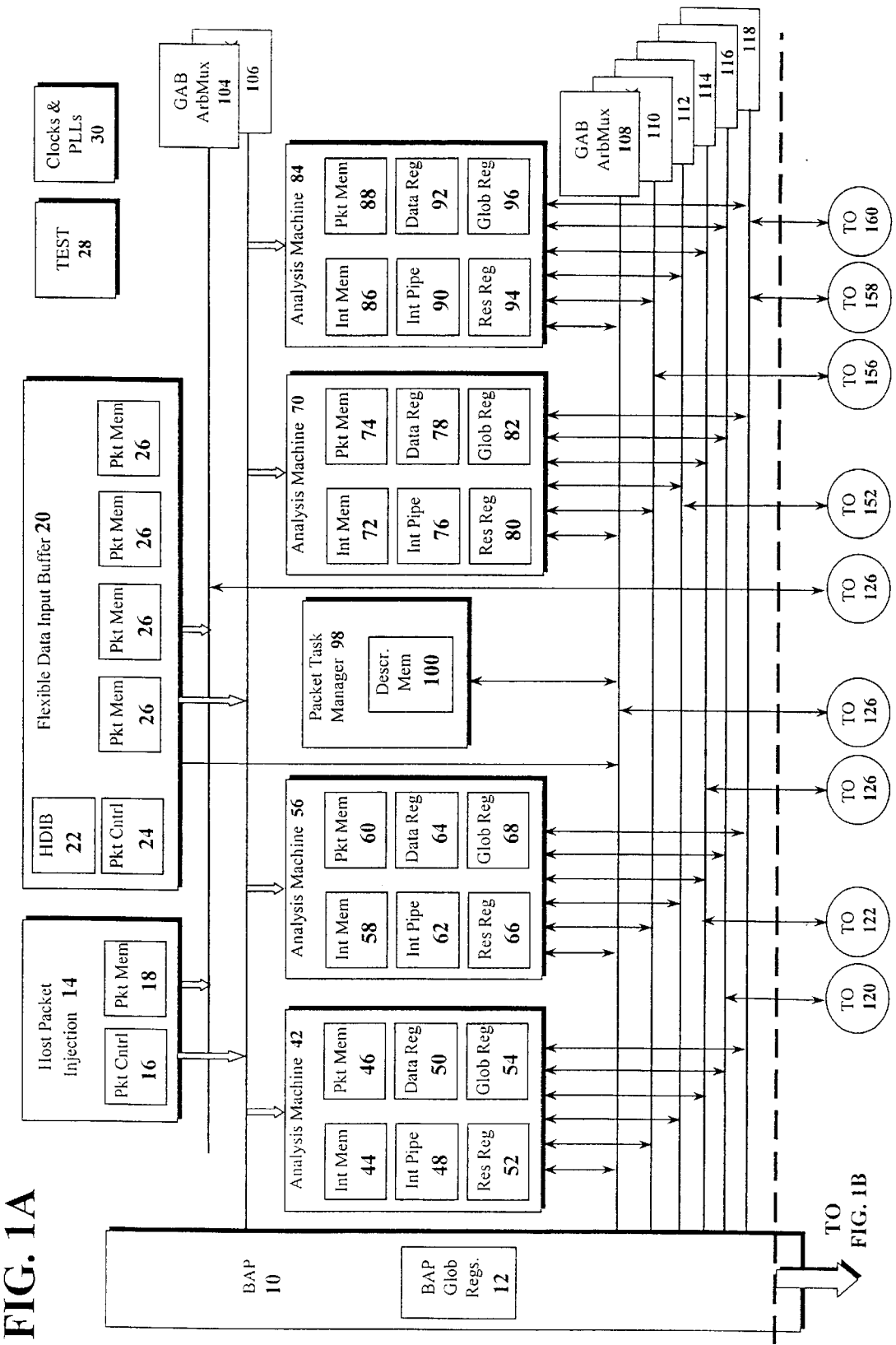

EXTENDED DOUBLE WORD ACCESSES

BACKGROUND OF THE INVENTION

1. Field of the Invention

The present invention relates to the field of data communications and data processing. More particularly, the present invention relates to an indexed buffering method for accessing memory or register elements wider than the bus bandwidth.

2. Description of Related Art and General Background

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. This provides only temporary relief as network wire speeds have increased exponentially recently (e.g., Ethernet's 10, 100, to 1,000 MBps increase) while processing speeds have traditionally improved, on average, by a factor of two every 18 months. It is clear that most of current solutions will run out of steam, as the faster media become the mainstream.

SUMMARY OF THE INVENTION

Methods and apparatuses consistent with the principles of the present invention, as embodied and broadly described herein, provides an indexed buffering scheme to access memory and register elements wider than a bus bandwidth. In order to achieve this end, the present invention includes a full 32-bit multiplexed address/data bus having a multiple bit word alignment and an interface having a four word deep multiple write buffer capable of burst access of up to and greater than a 128 bit wide memory element.

The present invention, therefore, may be directed to a system, or one or more parts thereof, for producing an extended double word access for transferring data, in the form of packets, at a rate of about 10 gigabits per second. This is accomplished through a scheme of only reading and writing the amount of data needed during processing or packet transfer. An example of such would be if reading a 32 bit word from a 128 bit bus, rather than wasting 96 bits of bandwidth, the inventive method provides additional data burst in order to maximize data transfer. Likewise, if writing a 128 bit word to a 32 bit bus, the inventive method provides a four cycle burst, keeping the 128 bit intact across the 32 bit bus. The inventive method provides a solution, which includes a variable data length, that is some multiple of the bus width. Such a system may involve hardware support for larger width accesses, as well as support for special operation access.

BRIEF DESCRIPTION OF THE DRAWINGS

The above and other objects, features and advantages of the present invention are further described in the detailed description which follows, with reference to the drawings by way of non-limiting exemplary embodiments of the invention, wherein like reference numerals represent similar parts of the present invention throughout the several views and wherein:

FIGS. 1A and 1B are a block diagram of the route switch packet architecture according to the present invention.

DETAILED DESCRIPTION OF THE EXEMPLARY EMBODIMENT

Figure 1B:
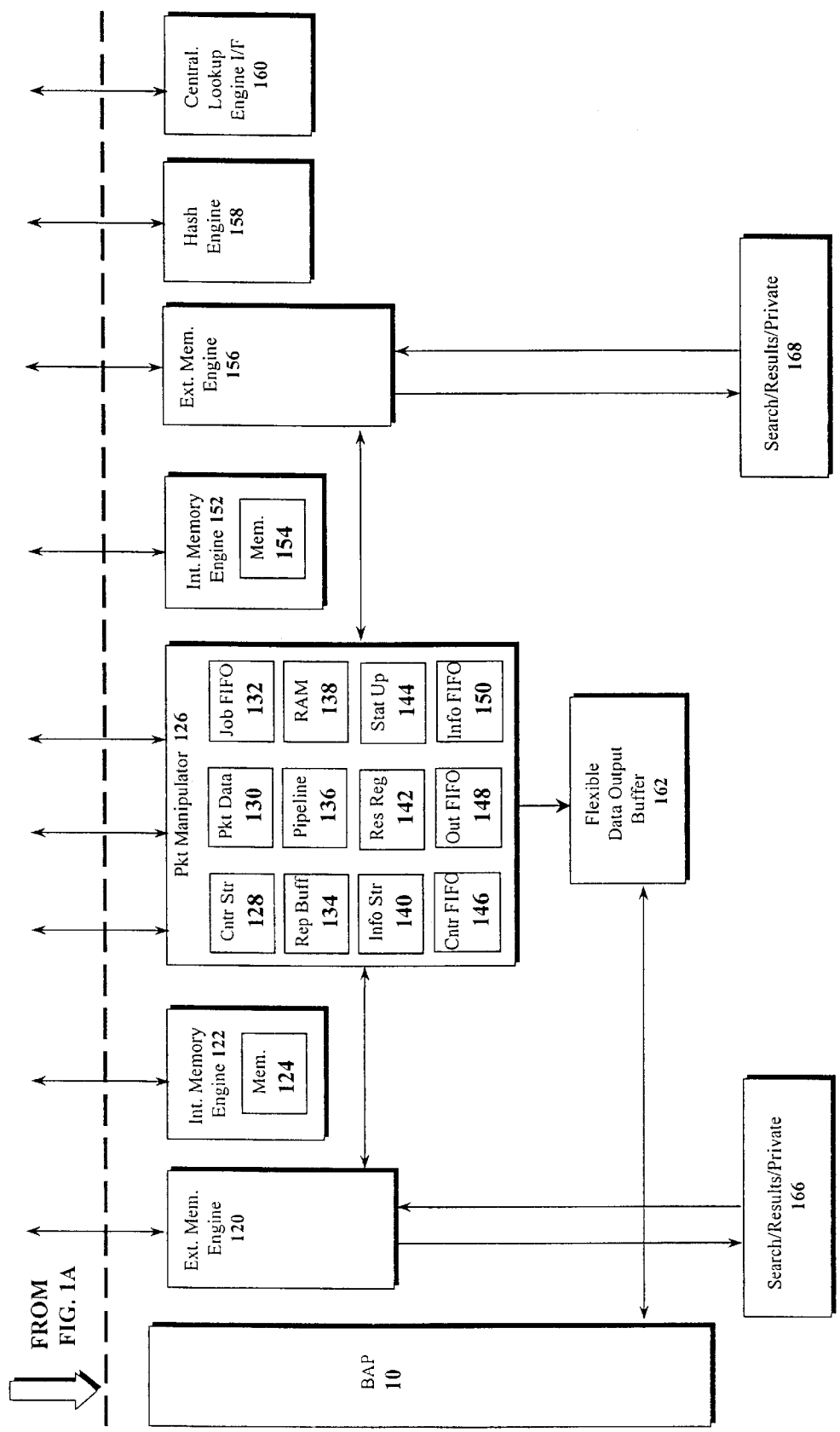

The innovative teachings of the present application will be described with particular references to the present embodiments. However, it should be understood that this class of embodiments provides only a few examples of the many advantageous uses of the innovative teachings described herein. In general, statements made in the specification of the present application do not necessarily delimit any of the various claimed inventions. Moreover, some statements may apply to some inventive features but not to others.

The present invention generally relates to communication networking host system and, more particularly, to packet processing architecture employed within a communication network that provides fast path processing and enhanced flexibility/adaptability of packet processors. The packet processing architecture will hereinafter be referred to as packet router mechanism of a communications networking host system for fast path processing of data packets at a rate around 10 gigabits per second having several components. Such a system is set forth in co-pending application, filed on the even day herewith, entitled ROUTE SWITCH PACKET ARCHITECTURE, and herein incorporated by reference. In the packet processing architecture, the inventive usage of burst reads/write of data words exceeding the bus width of 32 bits produces a formidable method for transferring data packet at a rate approximating 10 gigabits per second.

As shown in FIGS. 1A and 1B, an embodiment of the switching router processor according to one aspect of the invention comprises Bi-directional Access Port (BAP) 10, Host Packet Injection (HPI) 14, Flexible Data Input Buffer (FDIB) 20, Test 28, Clock & PLLS 30, Analysis Machines (AMs) 42, 56, 70, 84, Packet Task Manager (PTM) 98, Global Access Buses (GAB) 108, 110, 112, 114, 116, 118, External Memory Engines (EME) 120, 156, Internal Memory Engines (IME) 122, 152, Packet Manipulator (PM) 126, Hash Engine (HE) 158, Centralized Look-Up Engine Interface (CIF) 160, Flexible Data Output Buffer (FDOB) 162, and Search/Results/Private 166, 168. With the exception of Search/Results/Private 166, 168, the combination of the above described elements may be considered a multi-thread packet processor.

BAP 10 is operationally connected to each of the above described elements of the multi-thread packet processor. BAP 10 supports accesses to and from a generic host and peripheral devices. The multi-thread packet processor is the arbiter of the BAP 10 bus. Each element is capable of interfacing via one or more GABs 108, 110, 112, 114, 116, 118. Each AM 42, 56, 70, 84 has 32 independent threads used for packet processing. The packet processing effected by AMs 42, 56, 70, 84 involves determining what packets are and what to do with them. AMs 42, 56, 70, 84 do not modify packets. All modifications of a packet are effected in PM 126, which is a programmable streaming packet modification engine. PM 126 has the ability, when directed, to forward a packet, drop a packet, or execute a set of instructions for modifying and forwarding a packet. Control is passed to PM 126 from PTM 98. PTM 126 is the multi-thread packet processor mechanism for getting packets from FDIB 20, dispatching them to AMs 42, 56, 70, 84, and finally dispatching them to PM 126. EMEs 120, 156 are resources shared by AMs 42, 56, 70, 84 and PM 126. IMEs 122, 152 are resources shared by AMs 42, 56, 70, 84 and PM 126 that each contain an internal memory that is capable of reads, writes, read/clear, atomic addition, and atomic statistics addition operations through a GABS 108, 110, 112, 114, 116, 118 connection. HE 158 is a resource shared by AMs 42, 56, 70, 84 that hashes up to a 64-bit value down to 24 bits or less after a predetermined number of clock cycles. CIF 160 is resource shared by AMs 42, 56, 70, 84 that provides an interface to an external CLUE for centralized lookups. FDOB 162 is a semi-configurable packet output interface whose main fumction is to interface PM 126 to an external system.

The multi-thread packet processor is a complex packet processor. The processor incorporates program downloaded to its instruction memories and global register configurations set for various applications. Simple data structures in private, results, and statistics memory as well as complex search memory data structures may require initialization. The results and search memory structures may be routinely updated by the control processor with new routing information, as it becomes available.

Moreover, the multi-thread packet processor is a multi-layer packet processor. In other words, the multi-thread packet processor is configured for providing packet transfer capabilities in network communication Layers 1 to 4.

International architecture standards have been, and are being, developed to promote commonality and heterogeneous interoperability for all users of information technology and communications. A significant aspect of these standards is the international standards for Open Systems Interconnection (OSI) and the Systems Network Architecture (SNA). OSI and SNA both define seven-layer communications architectures in which each layer makes use of the services of the layer below and provides services to the layer above.

Layer 1 of the architecture is the physical connections between adjacent nodes, wires along which electrical signals pass.

Layer 2 is the data link control layer, providing fixed path configurations (point-to-point connections, multipoint connections and LANs) and possibly link-layer flow control and link-layer error-recovery. Layer 2 may also provide multi-path routing between intermediate nodes.

Layer 3 provides a subnetwork for multi-path routing between source and destination nodes and provides flow control within the subnetwork (e.g. multiplexing, segmenting). Layer 3 also provides internetworking links between the subnetworks.

Layer 4 is the transport control layer, overseeing communication across multiple underlying transport facilities.

Layer 5 is a data exchange layer providing a set of common signals used by applications for synchronization and regulation of the data exchange.

Layer 6 is a presentation services layer, interpreting API verbs and converting data where communicating end users require different syntax and formats.

Layer 7 is an application or transaction services layer, providing immediate service support for applications As a multi-layer packet processor, one function of the multi-thread packet processor is to lookup, process, and forward packets. The forwarding performance of the multi-thread packet processor is directly related to the maximum rate at which the minimum size packet can be presented, processed and forwarded. The minimum size Internet protocol (IP) packet is strictly an IP header of 20-bytes, although this packet is highly unlikely since 60–70% of backbone traffic is TCP. The typical minimum size packet is a TCP ACK packet, which contains a 20-byte IP header and a 20-byte TCP header equaling 40-bytes. The multi-thread packet processor is capable of handling both cases. The multi-thread packet processor is designed for up to an internal 250 MHz operation, with external memory and I/O speeds of up to 200 MHz. This provides roughly 16.5 millions of packets per second (MPPS) with 60 instructions per packet forwarding decision, adequately forwarding OC-192c line rate IP traffic for packets greater than or equal to 64-bytes.

In a packet processor, there is no explicit relationship from one packet to another packet except for the sequence of packets. The packets may be dispatched to multiple processing units or to multiple threads on a pipelined processing engine, as long as the packet sequence is maintained. Because of this, the multi-thread packet processor may be partitioned into multiple packet processing units, each being multi-threaded to keep all execution pipelines fully operating. Since this is a hardware partitioning, the packet sequencing is kept in hardware via PTM 98. As previously mentioned, the multi-thread packet processor is designed for up to 250 MHz with 4 packet processing units providing 16.5 MPPS with 60 instructions used per packet forwarding decision.

Because the multi-thread packet processor processes the packets, it includes search capabilities. A common search metric used is the number of lookups per second the processor is capable of performing. The metric is typically bound, so that relative performance can be measured. Lookups using the radix-4 method can be effectively used in the routing of IP packets. The number of 24-bit radix-4 lookups for the multi-thread packet processor is a direct relation of the number of memory accesses EMEs 120, 166 are able to do per second.

Bi-directional access port (BAP) 10 is designed for access by a general-purpose processor. All memory and register locations in the multi-thread processor address space are accessible from BAP 10. In an effort to make BAP 10 adaptable to future requirements, BAP 10 is available to AMs 42, 56, 70, 84 with the intention of reading status information from external peripheral devices. One application is the reading of external queue depths for use in implementing intelligent drop mechanisms. It is assumed that these algorithms only need to access the peripheral bus periodically. Thus, the interface can be shared with arbitrated host accesses. If host accesses are limited once a system is in a steady state, the multi-thread packet processor is capable of supporting accesses up to once per packet. At 16 million packets per second (MPPS), this equates to 16 million peripheral accesses per second. Thus, the multi-thread packet processor 250 MHz operation allows up to 15 cycles per access.

BAP 10 is a shared multiplexed address and data bus that supports accesses to and from a generic host and peripheral devices. BAP 10 contains Global Registers 12, which include configuration and status registers that are global to the multi-thread packet processor. Registers that are specific to an element's function are contained in that element and accessible via one of the element's GABs 108, 110, 112, 114, 116, 118 interfaces. BAP Global Registers 12 control the operation of BAP 10. These registers include the source address, destination address, status register, interrupt vector, transfer size register, and several others. BAP's 10 interface to a host uses a chip select and ready control handshaking mechanism, allowing BAP 10 to interface with an external host operating at an unrelated asynchronous frequency. BAP 10 interfaces to all of the multi-thread packet processor's elements on each of the internal GABs 108, 110, 112, 114, 116, 118. BAP 10 provides direct accesses to all internal memory and register locations for normal read and write operation types.

The multi-thread packet processor functions as the arbiter of the BAP 10 bus. Generally, a host requests and is granted access to BAP 10. A configuration register is used to assign priority either to the generic host to access the multi-thread packet processor or for AMs 42, 56, 70, 84 to access peripheral devices. A default priority is given to the generic host at reset, which facilitates the downloading of initial configuration data. After the configuration process is complete, the host sets the configuration register to give priority to AMs 42, 56, 70, 84. The host is still guaranteed a minimum access rate. The multi-thread packet processor may initiate access to peripherals and, as BAP 10 arbiter, the multi-thread packet processor does not need to request and be granted BAP 10 to access peripherals. The request/grant is only for the generic host. BAP 10 also provides the reset logic and buffering for the multi-thread packet processor.

The switching router processor includes a memory map, organized as 64-bit wide double words. Because BAP 10 data bus is generally configured to be 32-bits wide, the Least Significant Words (LSW) may be mapped to the even addresses (BAP_ADDR_DATA[0]="0") and the Most Significant Words (MSW) may be mapped to the odd address (BAP_ADDR_DATA[0]="1"). When the host writes to the even address, the 32-bit data is stored in a register internal to the BAP. When the host writes to the odd address, a 64-bit double word access is posted to the appropriate GABs 108, 110, 112, 114, 116, 118. The 64-bit double word is formed from the concatenation of the 32-bit MSW from the input bus and the 32-bit LSW from the internal register. When a read operation is performed from an even address, the entire 64-bit double word access is performed by the appropriate GABs 108, 110, 112, 114, 116, 118. The LSW is available on the BAP_ADDR_DATA pins and the 32-bit MSW is buffered within the BAP. The host must perform a read from the odd address to access the 32-bit MSW. It is understood that the scope of the claimed invention is not limited to 32 bit word having a 2 bit index. Rather, any size word is appropriate on the bus. The width of the word and subsequent index multiples are only dependent on the actual width of the bus.

The BAP 10 Extended Double Word Access (EDWA) supports accesses to memory or register elements wider than 64 bits using an indexed buffering method. For an EDWA, the LSW is considered index 0. The MSW can have an index of 1, 2 or 3, allowing access to 64, 96, and 128-bit wide memory elements respectively. For example, a host write to a 128-bit memory or register element requires the host to make four write accesses. This is most efficiently done using the 4-word burst mode option. It is understood that the scope of the claimed invention is not limited to 4 index multiples. Rather, any number of index multiple is appropriate on the bus, provided that the LSW has the index 0 and the MSW has the 'X' index multiple which is a multiple of the maximum bus width. The width of the word and subsequent index multiples are only dependent on the actual width of the bus.

The first write is to index 0, which the host indicates by setting the BAP_ADDR_DATA[1:0]="00" during the address phase of the access. This 32-bit value is stored in a register, internal to the BAP. In burst mode, the BAP 10 increments the address for each subsequent data word, which in this case corresponds to index 1, 2, and 3.

The second and third data words may also be stored in registers internal to the BAP. Upon accepting the fourth and final data word, the entire 128-bit wide data word is posted to the appropriate GABs 108, 110, 112, 114, 116, 118, and the access proceeds. It is noted that, all write operations to non-MSW indexes are buffered within the BAP. The actual data transfer to the memory element occurs when the host writes to the MSW index.

Similarly, a host read from a 128-bit memory or register element requires that the host make four read accesses, again the burst mode should be used. The first read is from index 0, which the host indicates by setting the BAP_ADDR_DATA[1:0]="00" during the address phase of the access. The entire 128-bit value is returned as a result of the single GABS 108, 110, 112, 114, 116, 118 read operation. The 32-bit LSW is available on the BAP_ADDR_DATA bus, and the upper 96 bits are stored in registers internal to the BAP. Subsequent read accesses from indexes 1, 2, and 3 result in a data transfer from the internal registers to the external 32-bit data bus. It is noted that, for an EDWA, the actual data transfer from the memory or register element occurs when the LSW is read. All access to indexes 1, 2, or 3 read the data from the internal registers.

The BAP 10 supports normal read and write operations for each of the internal GABs 108, 110, 112, 114, 116, 118. Some of the individual GABs 108, 110, 112, 114, 116, 118 can perform other operations such as read and clear, atomic add, statistics add, and lookups. For the external host to efficiently utilize these operation types, the BAP 10 provides a set of Special Access (SA) Registers. The special access registers are defined as: SA Data, SA Address, SA Control, SA Results and SA Status. The order in which the host accesses the registers is important since the SA Control register contains a readh_writel bit field that controls when the access takes place. When the readh_writel bit is set low, operations are initiated when the SA Data Register is written to. When the readh_writel bit is set high, operations are initiated when the SA Result Register is read from. As a result, the host should always write to the SA Control Register first. For example, to perform a statistics add, the host writes to the SA Control register setting the optype fields to Stats Add and the readh_writel bit high. Then, the host writes data into the SA Data register and writes the address into the SA Address register.

When the host performs a read from the SA Result register, the statistics add operation gets posted to the appropriate GABs 108, 110, 112, 114, 116, 118. The return result is stored in the SA Results register and is available on the BAP_ADDR_DATA bus. If the operation results in an error, such as a data overrun, the bus error signal (BAP_BUSERR_L) is set low. The SA Status register contains error codes that the host can read to determine the cause of the error. The SA registers also provide an efficient method of performing the same operation to successive addresses. The SA Control register has an auto-increment address flag and auto-increment address value field. When the auto-increment address flag is set, the value of the auto-increment address value field increments the SA Address register after each operation. Again, the readh_writel bit determines when an operation is initiated.

The address is incremented after the access has been completed. For example, the host performs a series of statistics add operations to a block of memory. The host writes to the SA Control register first, setting the optype field to "Stats Add", the readh_writel bit to high, the auto-increment bit high, and the auto-increment value field to a number from 1–8. The host then writes to the SA Data and SA Address registers. Each read of the SA Results register causes a statistics add optype access to be posted to the appropriate GABs 108, 110, 112, 114, 116, 118. The results register contains the value returned. The value in the increment value field increments the address register. Successive reads from the SA Results register gives the value from the statistics add of the next location.

While the invention has been described by way of example embodiments, it is understood that the words, which have been used herein, are words of description, rather than words of limitation. It is noted that this is accomplished through a scheme of only reading and writing the amount of data needed during processing or packet transfer. An example of such would be if reading a 32 bit word from a 128 bit bus, rather than wasting 96 bits of bandwidth, the inventive method provides additional data burst in order to maximize data transfer. Likewise, if writing a 128 bit word to a 32 bit bus, the inventive method provides a four cycle burst, keeping the 128 bit intact across the 32 bit bus. The inventive method provides a solution, which includes a variable data length, that is some multiple of the bus width. Changes may be made, within the purview of the appended claims, without departing from the scope and spirit of the invention in its broader aspects. Although the invention has been described herein with reference to particular structures, materials and embodiments, it is understood that the invention is not limited to the particulars disclosed. The invention extends to all equivalent structures, mechanisms, acts, and uses, such as are within the scope of the appended claims.

What is claimed is:

1. A method of using a data bus having a bandwidth of a first size, the data bus including a bi-directional access port having an internal register and an external bus for accessing data words, each of the data words having a least significant word and a most significant word, the data words having a second size wider than the first size of the bandwidth of the data bus, the method comprising:

indexing the second size into multiples of the first size, assigning the least significant word with the minimum indexed multiple address on the internal register;

assigning the most significant word with the maximum indexed multiple address on the external bus; and reading the entire data word by buffering the most significant word from the maximum indexed multiple address within the bi-directional access port while accessing the least significant word from the internal register with the minimum indexed multiple address.

2. A method of writing to a data bus having a bandwidth of a first size, the data bus including a bidirectional access port having an internal register and an external access bus for accessing data words having a least significant word and a most significant word, the data words having a second size wider than first size of the bandwidth of the data bus, the method comprising:

indexing the second size into multiples of the first size, assigning the least significant word the first index value;

assigning the most significant word the last index value;

addressing the first index value by writing into the internal register the data corresponding to the first index value;

incrementing the index by 1, and buffering the data in the internal register in the bi-directional access port;

addressing the subsequent index by writing into the internal register the data corresponding to the subsequent index, and buffering the subsequent data in the internal register in the bi-directional access port until reaching the last index value; and burst writing the entire data word into the bi-directional access port by serially writing each index value of data into a memory element.

3. The method according to claim 2, wherein the data word has a length at least equal to the width of the data bus, and wherein the indices are multiples of the width of the data bus and assigned respectively to the most significant word of the data.

4. A method of reading from a data bus having a bandwidth of a first size, the data bus including a bi-directional access port having an internal register and an external access bus for accessing data words having a least significant word and a most significant word, the data words having a second size wider than first size of the bandwidth of the data bus, the method comprising:

indexing the second size into multiples of the first size;

assigning the least significant word of a first index value;

assigning the most significant word the last index value;

addressing the first index value by reading into the internal register the data corresponding to the first index value;

incrementing the index value by 1, buffering the data in the internal register in the bi-directional access port;

addressing the subsequent index value by reading into the internal register the data corresponding to the subsequent index, and buffering the subsequent data in the internal register in the bi-directional access bu port until reaching the last index value; and burst reading the entire data word into the bi-directional access port by serially reading each index into a memory element.

5. The method according to claim 4, wherein the data word has a length at least equal to the width of the data bus, and wherein the indices are multiples of the width of the data bus and assigned respectively to the most significant word of the data.

* * * * *